(12) United States Patent
Kim (10) Patent No.: US 7,369,157 B2
(45) Date of Patent: May 6, 2008

(54) VIDEO MONITORING SYSTEM USING DAISY CHAIN

(75) Inventor: Hak-Sung Kim, Suwon-Si (KR)

(73) Assignee: Alogics., Ltd. (KR)

( * ) Notice: Subject to any disclaimer, the term of this patent is extended or adjusted under 35 U.S.C. 154(b) by 826 days.

(21) Appl. No.: 10/332,207

(22) PCT Filed: Jul. 11, 2002

(86) PCT No.: PCT/KR02/01314

§ 371 (c)(1),
(2), (4) Date: Jan. 3, 2003

(87) PCT Pub. No.: WO03/009599

PCT Pub. Date: Jan. 30, 2003

(65) Prior Publication Data

US 2004/0008256 A1    Jan. 15, 2004

(30) Foreign Application Priority Data

Jul. 16, 2001  (KR) .............. 10-2001-0042841
Apr. 24, 2002  (KR) .............. 10-2002-0022568

(51) Int. Cl.
*H04N 7/18*    (2006.01)

(52) U.S. Cl. ............. 348/159; 348/581; 348/588; 348/565; 348/584; 348/705; 348/207; 348/143

(58) Field of Classification Search ........... 348/159, 348/581, 588, 565, 584, 705, 207, 143
See application file for complete search history.

(56) References Cited

U.S. PATENT DOCUMENTS 5,317,402 A * 5/1994 Wong et al. ............ 348/705
5,365,278 A * 11/1994 Willis .................... 348/581

FOREIGN PATENT DOCUMENTS

| JP | 5-094411 | 4/1993 |
| JP | 05094411 | 4/1993 |
| JP | 08032873 | 2/1996 |
| JP | 09098312 | 4/1997 |
| JP | 10098707 | 4/1998 |
| JP | 10191310 | 7/1998 |
| KR | 1998-081891 | 11/1998 |
| KR | 1999-058416 | 7/1999 |

* cited by examiner

*Primary Examiner*—Shawn S. An
(74) *Attorney, Agent, or Firm*—Cantor Colburn LLP (57) ABSTRACT

A video monitoring system using daisy chain is disclosed. The video monitoring system can display a multiplexed image consisting of four or more pictures by bypassing video signals captured by a plurality of video cameras through several stages.

8 Claims, 7 Drawing Sheets

VIDEO MONITORING SYSTEM USING DAISY CHAIN

FIELD OF THE INVENTION

The present invention relates to a video monitoring system and, more particularly, to a video monitoring system using daisy chain.

DESCRIPTION OF THE RELATED ART

A conventional video monitoring system is installed in a house, department store, bank, factory, exhibition hall, etc. to monitor visitors and to prevent a burglary. The conventional video monitoring system includes a plurality of video cameras for capturing video signals corresponding to objects in monitored areas, a signal processor for processing video signals captured by the video cameras, and a video display device for displaying a multiplexed image consisting of a plurality of pictures corresponding to the processed video signals on one display screen.

The conventional video monitoring system scales down video data corresponding to video signals captured by four video cameras according to a predetermined scale-down ratio and displays a multiplexed image consisting of four pictures corresponding to the scaled-down video data. Here, the multiplexed image consisting of four pictures is referred to as a quad image. A full screen image, or a multiplexed image consisting of four pictures, eight pictures, or sixteen pictures corresponding to video signals outputted from video cameras can be displayed according to a combination of quad images.

Figure 1:
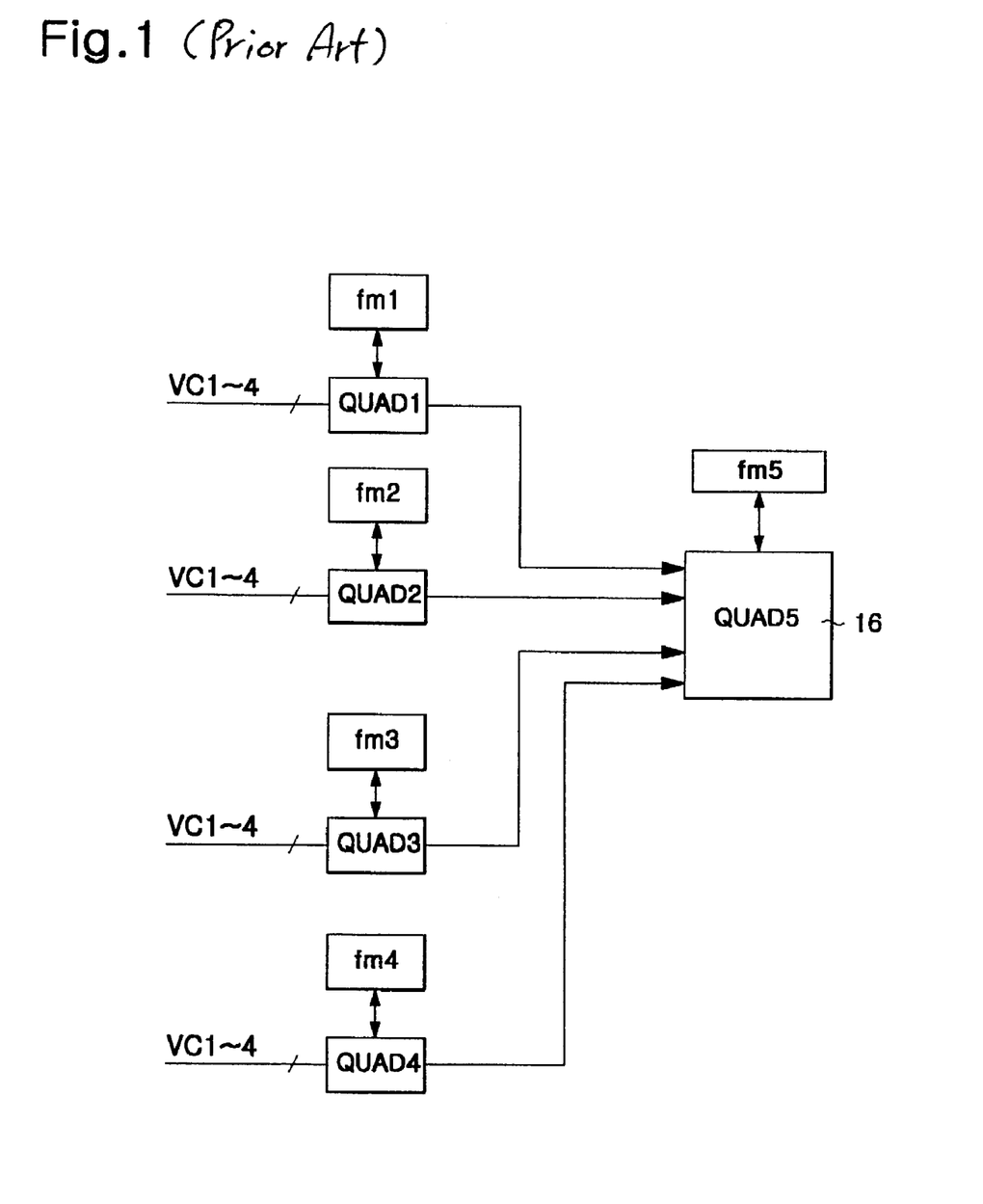
FIG. 1 is a view showing a conventional video monitoring system including a plurality of quad units.

For example, when a multiplexed image consisting of sixteen pictures corresponding to video signals captured by video cameras is displayed based on the quad image combination, four quad units QUAD1-QUAD4 are configured as shown in FIG. 1. In this case, frame memories fm1-fm4 are provided to configure the respective quad images. A frame memory fm5 and a quad unit QUAD5 are provided to combine quad video data from the respective quad units QUAD1-QUAD4 and to process the combined quad video data so that a multiplexed image consisting of sixteen pictures corresponding to the video data can be displayed.

As the number of quad units is increased, the number of frame memories needs to be increased to configure a multiplexed image consisting of sixteen pictures. A last stage of the conventional video monitoring system includes another quad unit QUAD5 for processing the quad video data from the respective quad units in addition to the four quad units QUAD1-QUAD4, and another frame memory fm5 for configuring the multiplexed image consisting of sixteen pictures in addition to the frame memories fm1-fm4. As a result, there is a problem in that the video monitoring system requires a complex configuration to configure a multiplexed image consisting of more than four pictures, resulting in increased cost for the system configuration.

SUMMARY OF THE INVENTION

The present invention has been made in view of the above problems, and the present invention provides a video monitoring system using daisy chain, which can display a multiplexed image consisting of more than four pictures with its simple configuration by bypassing video signals captured by a plurality of video cameras through several stages.

The present invention also provides a video monitoring system using daisy chain, which can display a multiplexed image having a plurality of pictures corresponding to a plurality of channels by arbitrarily extending the number of pictures constituting the multiplexed image using a single memory.

According to an aspect of the present invention, there is provided a video monitoring system configuring and displaying a multiplexed image consisting of a plurality of pictures each corresponding to a video signal captured by each of video cameras, including: A/D (Analog/Digital) converters each of which converts a channel video signal outputted from the corresponding video camera into digital video data; one or more slave video signal processors coupled in a daisy chain manner each of which scales down digital video data of individual channels outputted through a video source channel from each of the A/D converters, outputs the scaled-down digital video data to a first bypass channel of the slave video signal processor, and re-collects and outputs digital video data outputted through a first bypass channel of a preceding slave video signal processor and collected digital video data outputted through a second bypass channel of the preceding slave video signal processor to a second bypass channel of the slave video signal processor; a master video signal processor that scales down digital video data of individual channels outputted through a video source channel from A/D converters, records on a frame memory the scaled-down digital video data and digital video data outputted from first and second bypass channels of a last slave video signal processor, and configures and outputs video data corresponding to a multiplexed image; and a D/A (Digital/Analog) converter converting the video data corresponding to the multiplexed image into an analog video signal and outputting the analog video signal to a video display device.

The slave video signal processor scales down the digital video data corresponding to the video signals that are captured by each of the video cameras and inputted through the video source channel, and outputs the scaled-down digital video data. In addition, the slave video signal processor bypasses the digital video data outputted from another slave video signal processor placed at its preceding stage, and outputs the bypassed digital video data to another slave video signal processor placed at its following stage. The master video signal processor records on the frame memory the digital video data corresponding to the video signals that are captured by individual video cameras and inputted through its video source channel, and the digital video data bypassed from the slave video signal processor placed at its preceding stage, configures and outputs a multiplexed image to a video display device. Therefore, the video monitoring system displays the multiplexed image with its simple configuration.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the annexed drawings. In the following description, a detailed description of known functions and configurations incorporated herein will be omitted when it may make the subject matter of the present invention rather unclear.

Figure 2:
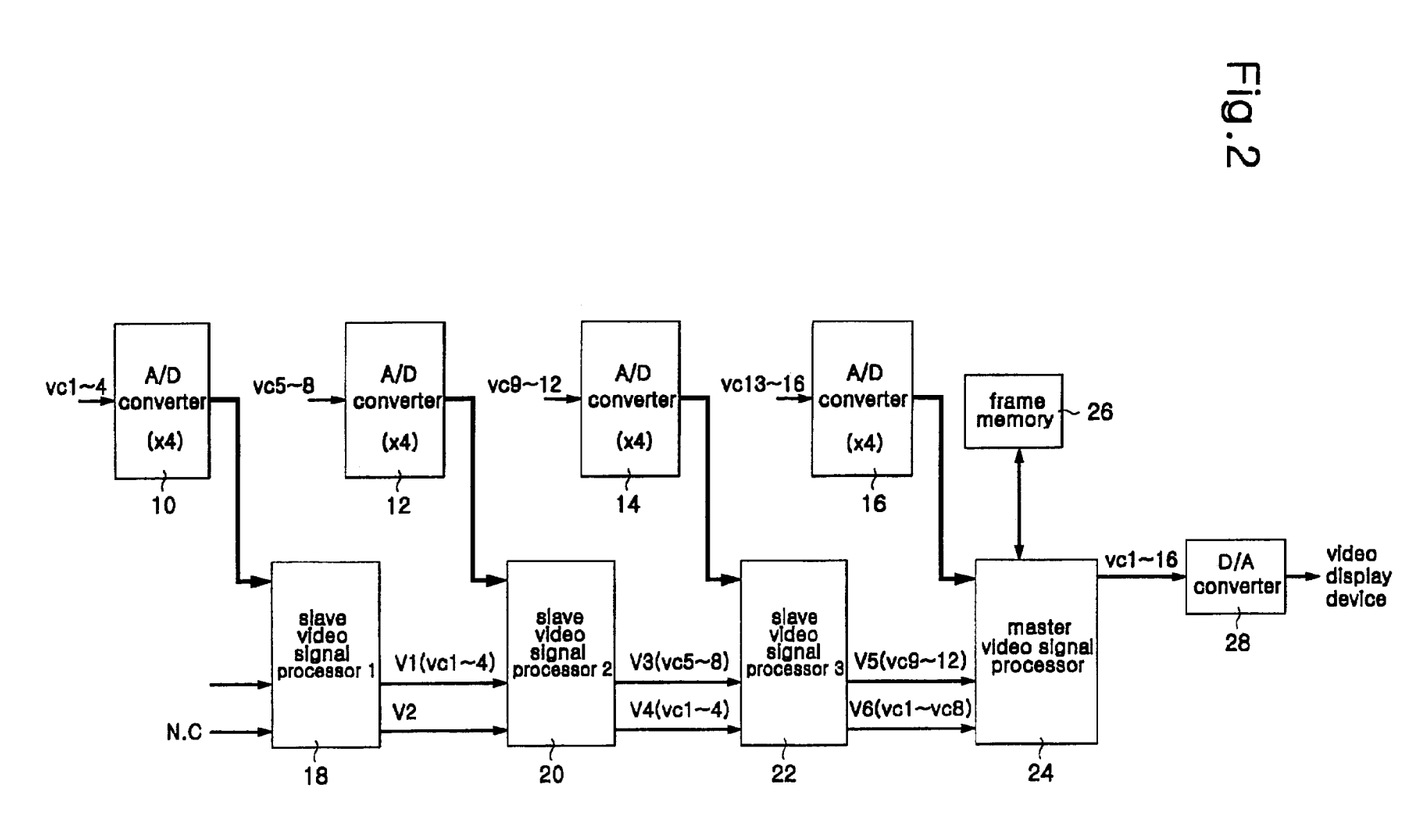
FIG. 2 is a view showing a video monitoring system using daisy chain in accordance with a first embodiment of the present invention.

FIG. 2 is a view showing a video monitoring system using daisy chain in accordance with a first embodiment of the present invention. In more detail, FIG. 2 is a view showing a video monitoring system for displaying a multiplexed image consisting of sixteen pictures on a video display device.

As shown in FIG. 2, the video monitoring system for displaying a multiplexed image consisting of sixteen pictures includes three slave video signal processors 18, 20 and 22 and one master video signal processor 24. The slave video signal processors 18, 20 and 22 and master video signal processor 24 may include the same components as described below.

Referring to FIG. 2, A/D (Analog/Digital) converters 10, 12, 14 and 16 are coupled to video source channels of the slave video signal processors 18, 20 and 22 and master video signal processor 24. The A/D converters 10, 12, 14 and 16 convert channel video signals outputted from video cameras vc1-vc16 into digital video data.

The slave video signal processors 18, 20 and 22 scale down the digital video data of individual channels outputted from the A/D converters 10, 12 and 14 through the video source channels and then output the scaled-down digital video data to a first bypass channel V1, V3 and V5. The slave video signal processors 18, 20 and 22 collect the digital video data of the video source channels outputted through the first bypass channel N.C., V1 and V3 and the digital video data outputted through a second bypass channel N.C., V2 and V4 and then output the collected digital video data to the second bypass channel V2, V4 and V6, respectively. The slave video signal processors 18, 20 and 22 are coupled to one another by the daisy chain.

The master video signal processor 24 scales down the digital video data outputted from the A/D converters 16 through a video source channel. The master video signal processor 24 records the digital video data outputted from the first bypass channel V5 and the second bypass channel V6 coupled to the third slave video signal processor 22, placed at a preceding stage of the master video signal processor 24, in a frame memory 26. The frame memory 26 stores the digital video data for configuring a multiplexed image consisting of a plurality of pictures. For reference, a memory controller equipped with the master video signal processor 24 controls access to the frame memory 26.

A D/A (Digital/Analog) converter 28 converts the video data corresponding to the multiplexed image outputted from the master video signal processor 24 into an analog video signal. For reference, "N.C." of FIG. 1 is an abbreviation of "No Connection". Configurations of the slave video signal processors 18, 20 and 22 and master video signal processor 24 in the video monitoring system will be described below in detail.

Figure 3:
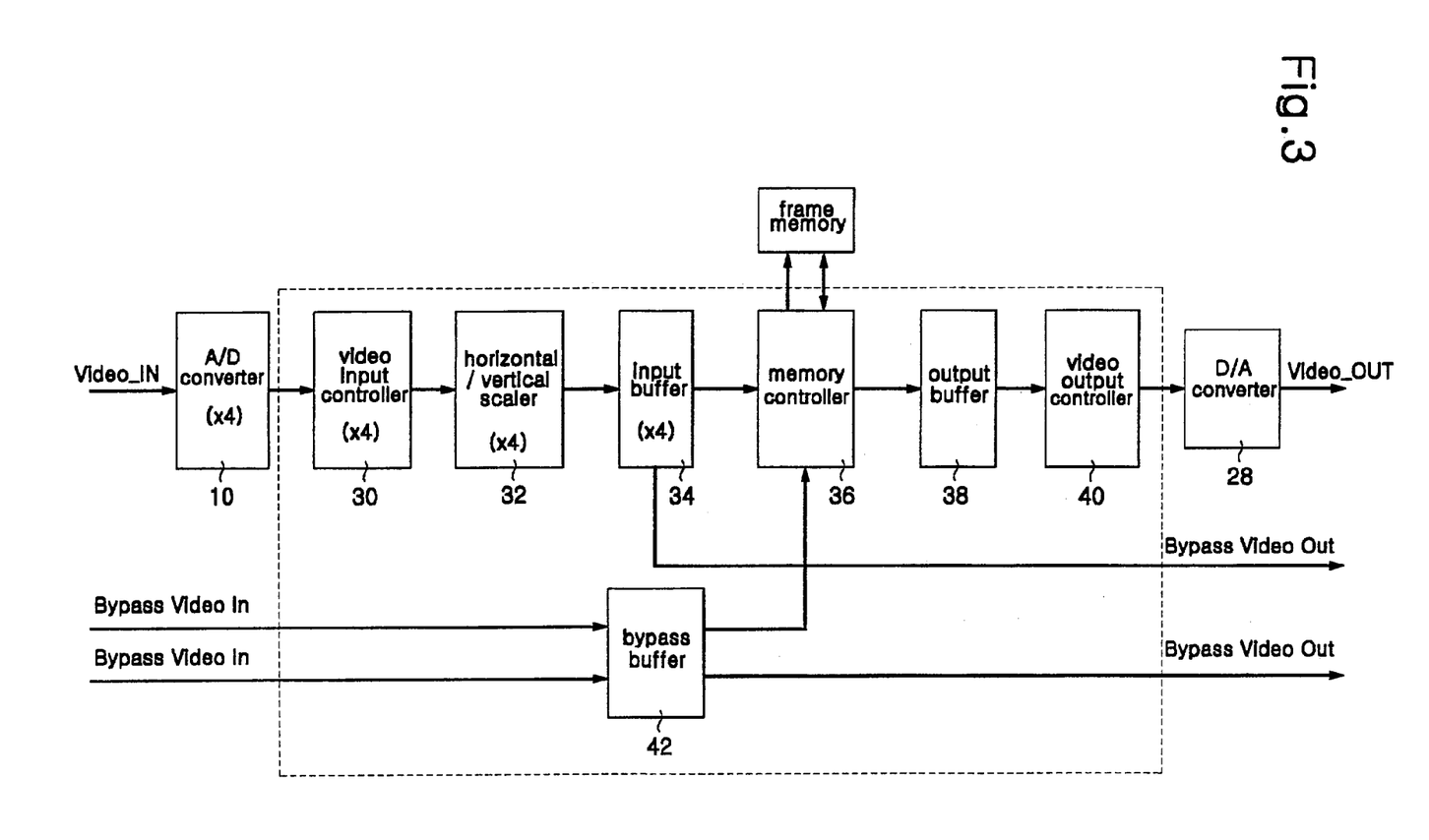
FIG. 3 is a block diagram illustrating a video signal processor for implementing the video monitoring system shown in FIG. 2.

FIG. 3 is a block diagram illustrating a master or slave video signal processor for implementing the video monitoring system shown in FIG. 2. In accordance with an embodiment of the present invention, the slave video signal processors 18, 20 and 22 and master video signal processor 24 comprise video input controllers 30, horizontal/vertical scalers 32, input buffers 34, a memory controller 36, an output buffer 38, a video output controller 40 and a bypass buffer 42, respectively, as shown in FIG. 3.

The video input controllers 30 convert digital video data outputted from the A/D converters 10 through the video source channel into a format suitable for internal processing. The video input controllers 30 are included in a conventional quad chip and operate in the same manner as those included in the conventional quad chip.

In the video signal processors, the number of video input controllers 30 is the same as the number of A/D converters 10.

The horizontal/vertical scalers 32 scale down the digital video data outputted from the video input controllers 30 in a horizontal direction or/and in a vertical direction so that the digital video data can be stored as a multiplexed image. It is clear that the horizontal/vertical scalers 32 scale down the digital video data by performing interpolation between adjacent digital video data on the basis of scale-down ratios. The scale-down ratios in the horizontal and vertical directions can be varied according to the number of pictures constituting a multiplexed image to be displayed on a video display device. In the embodiment of the present invention, it is assumed that each slave video signal processor configures a multiplexed image consisting of four pictures. In the video signal processors, the number of horizontal/vertical scalers 32 is the same as the number of video cameras.

The input buffer 34 temporarily stores the video data outputted from the horizontal/vertical scalers 32 and then outputs the video data through two channels. One of the two channels is a first bypass channel (Bypass Video Out) and the other channel is needed in the memory controller 36 reading the video data.

The memory controller 36 reads the video data from the input buffer 34 in burst mode and records the video data at frame memory addresses designated channel by channel. The recorded video data is read out so that it can be displayed in real time. In accordance with the present invention, the slave video signal processors 18, 20 and 22 are not directly connected to the memory controller 36 and only the master video signal processor 24 is directly connected to the memory controller 36.

The output buffer 38 temporarily stores the video data corresponding to a multiplexed image to be displayed on a display device. The video output controller 40 combines supplementary information (including time information, channel information, etc.) with the video data of the multiplexed image outputted from the output buffer 38 and outputs the video data combined with the supplementary information. The video data outputted from the video output controller 40 is converted into an analog video signal by the D/A converter 28 and then the analog video signal is outputted to the video display device.

The bypass buffer 42 receives and temporarily stores the video data from a first bypass channel (Bypass Video In) and a second bypass channel (Bypass Video In) coupled to a slave video signal processor placed at its preceding stage. Then, the bypass buffer 42 outputs the stored video data to the memory controller 36 and through the second bypass channel (Bypass Video Out). That is, the bypass buffer 42 collects the video data inputted through the bypass channels by temporarily storing and sequentially outputting the video data.

As described above, the slave video signal processors 18, 20 and 22 and the master video signal processor 24 according to the embodiment of the present invention may be composed of the same components as one another. However, when the video signal processor is employed as the slave video signal processor, it uses only the video data outputted through the first bypass channel coupled to an output terminal of the input buffer 34.

Figure 4:
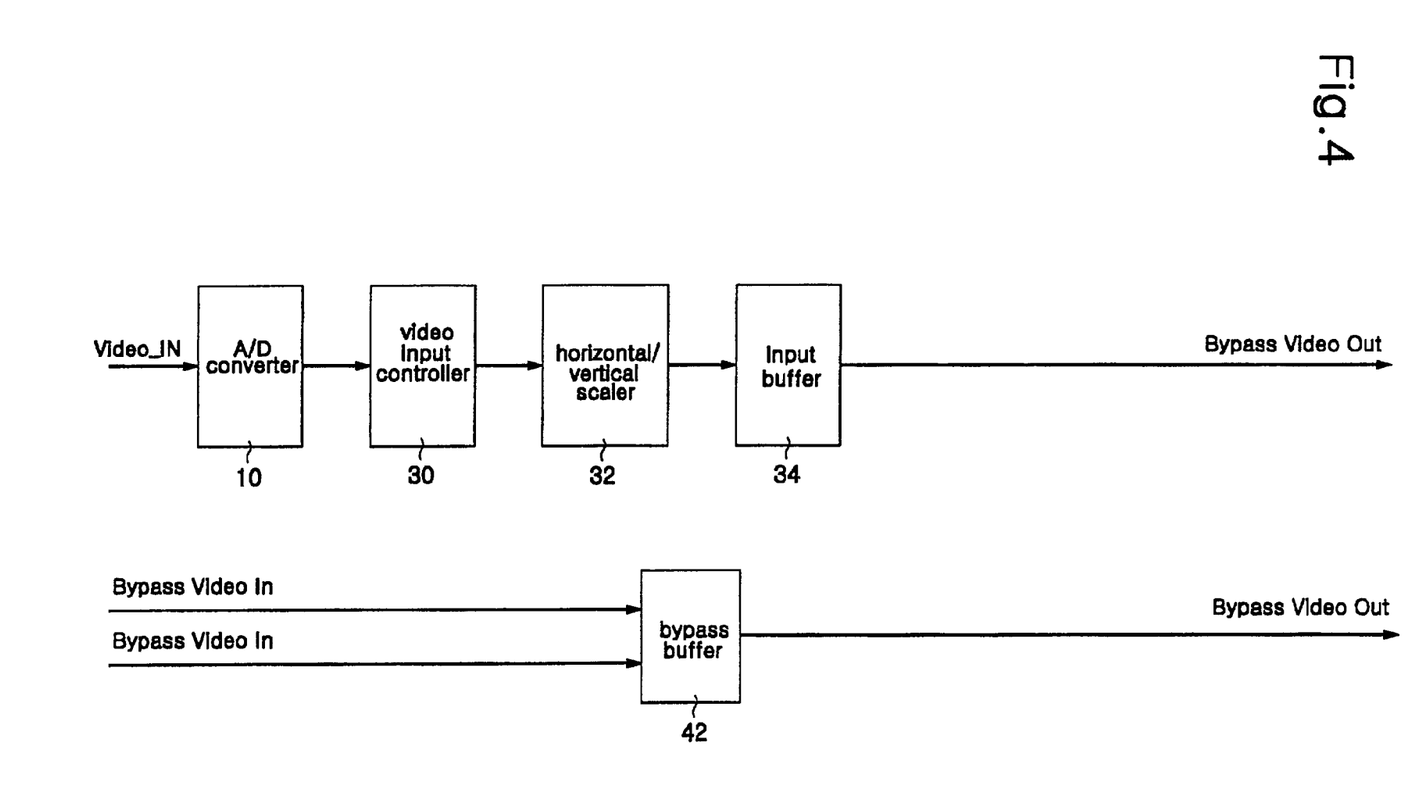
FIG. 4 is a view explaining a signal transfer procedure when the video signal processor shown in FIG. 3 is employed as a slave video signal processor.
Figure 5:
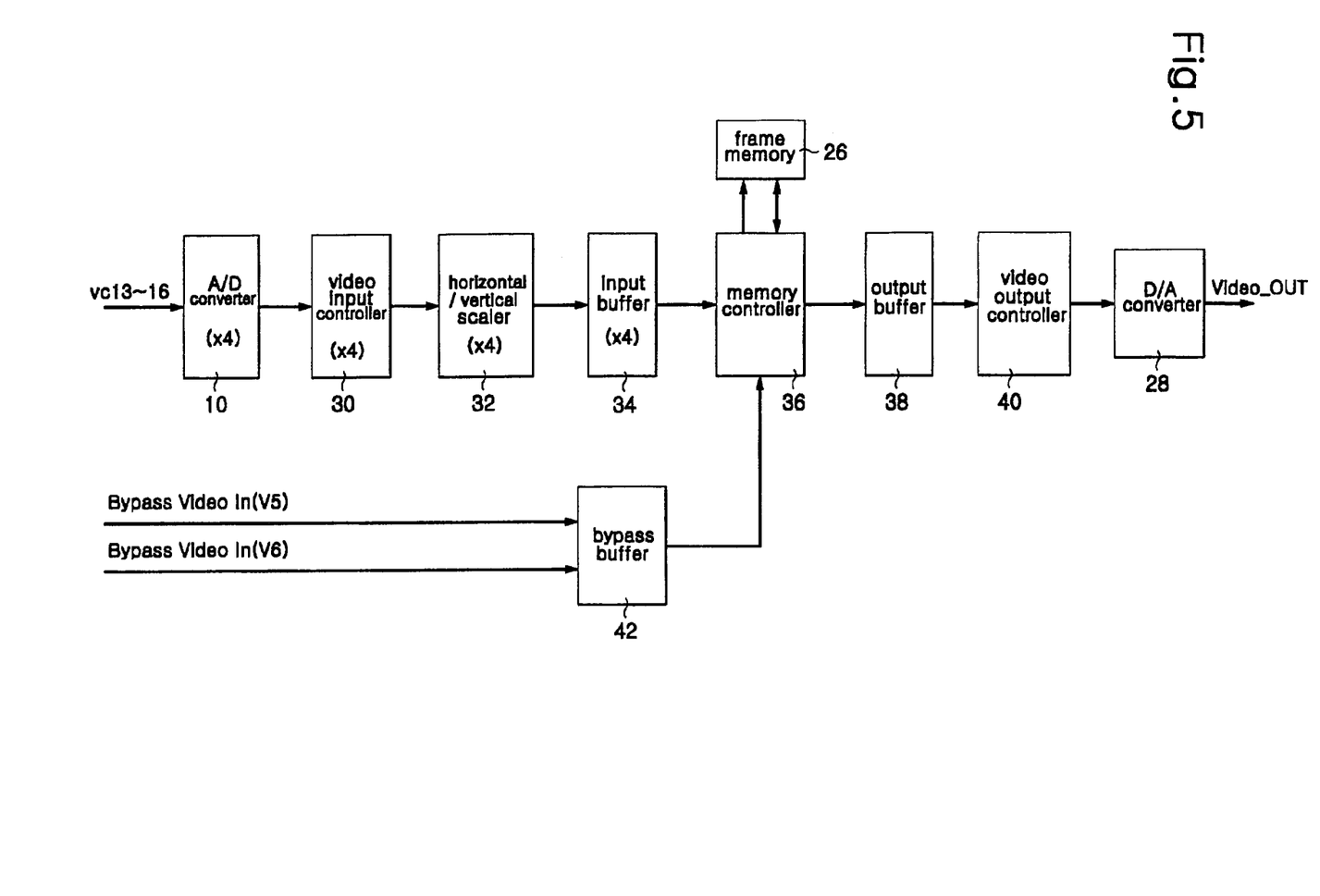
FIG. 5 is a view explaining a signal transfer procedure when the video signal processor shown in FIG. 3 is employed as a master video signal processor.

FIG. 4 is a view explaining a signal transfer procedure when the video signal processor shown in FIG. 3 is employed as a slave video signal processor. FIG. 5 is a view explaining a signal transfer procedure when the video signal processor shown in FIG. 3 is employed as a master video signal processor.

In other words, when the video signal processor shown in FIG. 3 is employed as the slave video signal processor, the digital video data inputted through the video source channels is transferred to another slave video signal processor or the master video signal processor placed at the following stage of the slave video signal processor through a video input controller 30, a horizontal/vertical scaler 32, an input buffer 34 and a first bypass channel (Bypass Video Out). Then, the slave video signal processor collects the digital video data inputted through the first bypass channel and a second bypass channel coupled to another slave video signal processor placed at its preceding stage and then outputs it through the second bypass channel. That is, since the slave video signal processor collects the video data inputted through the video source channel placed at its preceding stage, it can be configured as shown in FIG. 4 or FIG. 3.

The video signal processor shown in FIG. 5 represents a case in which the video signal processor shown in FIG. 3 is operated as the master video signal processor. Video signals outputted from video cameras vc13-vc16 are inputted into a video source channel through A/D converters 10. Then, the digital video data inputted through the video source channels is stored in a frame memory 26 through video input controllers 30, horizontal/vertical scalers 32 and input buffers 34. The digital video data outputted through bypass channels V5 and V6, coupled to another slave video signal processor placed at the preceding stage of the video signal processor shown in FIG. 5, is stored in the frame memory 26 through a bypass buffer 42 by a frame controller 36. Accordingly, the video data stored in the frame memory 26 is controlled by the memory controller 36 and outputted through an output buffer 38 and a video output controller 40 to the outside.

The operation of the video monitoring system shown in FIG. 2 will be described in which the slave video signal processors 18, 20 and 22 and the master video signal processor 24 are coupled by the daisy chain.

First, video signals captured by four video cameras vc1-vc4 are converted into digital video data by A/D converters 10. Then, the digital video data is inputted into a video source channel coupled to the slave video signal processor 18. Then, the slave video signal processor 18 scales down the size of the video data to be suitable for a multiplexed image consisting of sixteen pictures and outputs the scaled-down video data. The scaled-down video data is outputted to a first bypass channel V1 through input buffers 34 and then transferred to the slave video signal processor 20. Since no video signal processor is connected to the preceding stage of the slave video signal processor 18, there is no data to be transferred to the slave video signal processor 20 through a second bypass channel V2.

On the other hand, video signals captured by four video cameras vc5-vc8 are converted into digital video data by A/D converters 12. Then, the digital video data is inputted into a video source channel coupled to the slave video signal processor 20. Then, the slave video signal processor 20 scales down the size of the video data to be suitable for a multiplexed image consisting of sixteen pictures and outputs the scaled-down video data. The scaled-down video data is output to the first bypass channel V3 (vc5-vc8) through input buffers 34 and then transferred to the slave video signal processor 22.

After processing the video signals captured by the video cameras vc1-vc4, the slave video signal processor 20 receives the digital video data through the first bypass channel V1 coupled to the slave video signal processor 18 placed at its preceding stage. The digital video data is transferred to the second bypass channel V4 (vc1-vc4) through the bypass buffer 42.

After processing video signals captured by the video cameras vc5-vc8, the slave video signal processor 22 receives the scaled-down video data through the first bypass channel V3. Further, after processing video signals captured by the video cameras vc1-vc4, the slave video signal processor 22 receives the scaled-down video data through the second bypass channel V4. The video data outputted from two bypass channels V3 and V4 is collected in the bypass buffer 42 and then transferred to the master video signal processor 24 through the second bypass channel V6 (vc1-vc8). The digital video data inputted into the video source channel coupled to the slave video signal processor 22 is transferred to the master video signal processor 24 through the first bypass channel V5 (vc9-vc12) according to the above-mentioned operation.

Accordingly, the bypass buffer 42 in the master video signal processor 24 collects the digital video data (vc1-vc12) inputted through the first bypass channel V5 and the second bypass channel V6 and then outputs it to the memory controller 36. The digital video data of the video source channel corresponding to the video signals captured by the video cameras vc13-vc16 is scaled down and then transferred to the memory controller 36. The memory controller 36 in the master video signal processor 24 records the digital video data of sixteen channels at designated addresses of the frame memory 26 to configure the multiplexed image consisting of sixteen pictures. The video data corresponding to the multiplexed image consisting of sixteen pictures stored in the frame memory 26 is accessed by the memory controller 36 and then transferred to an external D/A converter 28 through the video output controller 40, such that the multiplexed image consisting of sixteen pictures is displayed on the video display device.

Since the frame memory needs not to be included in each of the video signal processors to configure the multiplexed image consisting of sixteen pictures and an additional video signal processor is not needed to configure the multiplexed image consisting of sixteen pictures at a last stage of the video monitoring system, it is possible to provide a video monitoring system having a simple configuration.

Further, since a video signal processor having the same components is used either as a slave video signal processor or a master video signal processor, it is possible to simplify the system configuration and to simply extend or scale down the system.

Figure 6:
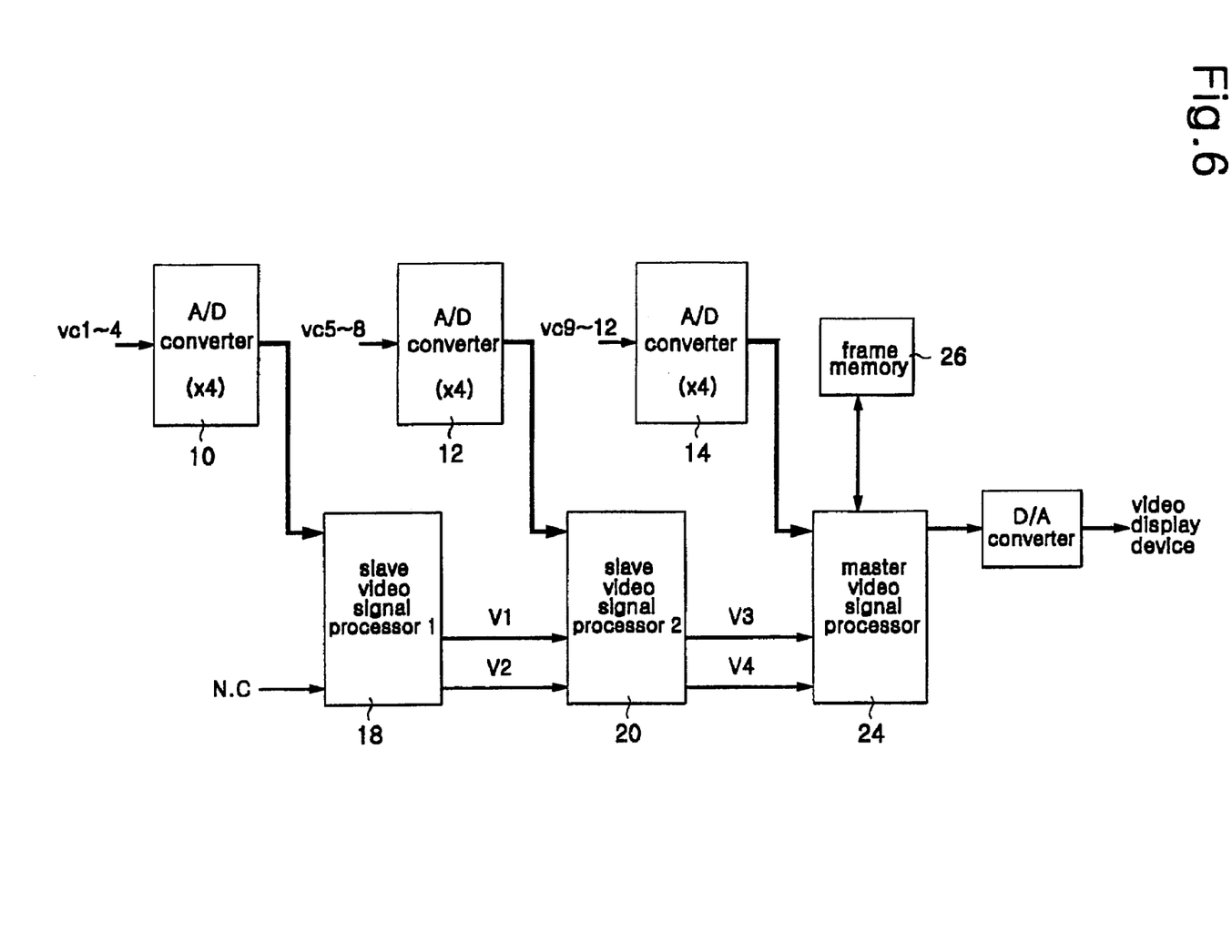
FIG. 6 is a view showing a video monitoring system using daisy chain in accordance with a second embodiment of the present invention.
Figure 7:
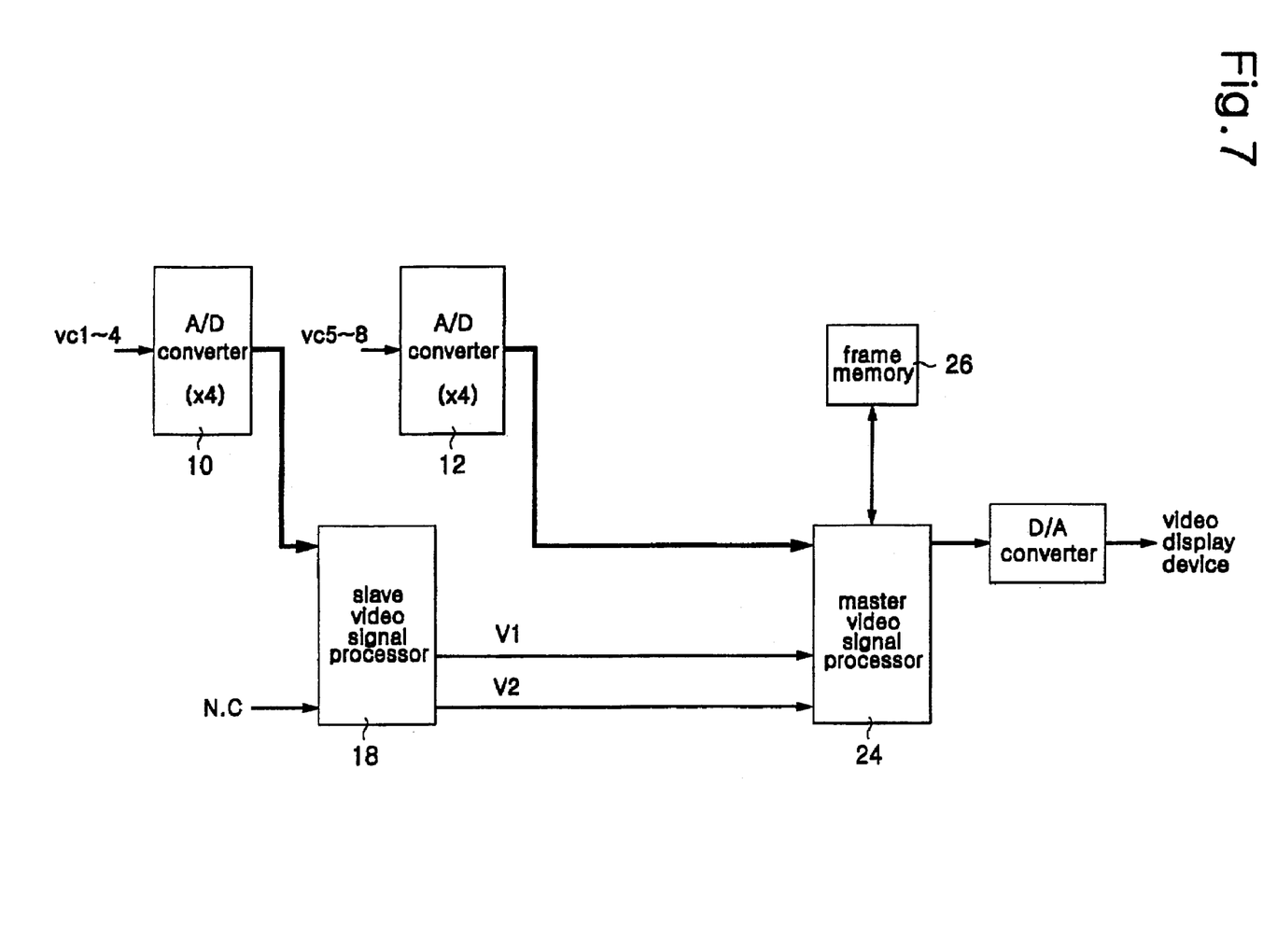
FIG. 7 is a view showing a video monitoring system using daisy chain in accordance with a third embodiment of the present invention.

Although the video monitoring system configuring and displaying a multiplexed image consisting of sixteen pictures has been described above, it can display a multiplexed image consisting of twelve pictures by combining two slave video signal processors 18 and 20 and one master video signal processor 24 through the daisy chain as shown in FIG. 6. Further, the video monitoring system can display a multiplexed image consisting of eight pictures by combining one slave video signal processor 18 and one master video signal processor 24 through daisy chain as shown in FIG. 7.

According to the present invention, the frame memory needs not to be included in each of video signal processors to configure a multiplexed image consisting of sixteen pictures, and an additional video signal processor is not needed to configure the multiplexed image consisting of sixteen pictures at a last stage of the video monitoring system. Accordingly, it is possible to provide the video monitoring system having a simple configuration.

Further, since video signal processors having the same components are used either as a slave video signal processor or a master video signal processor, it is possible to simplify the system configuration and to simply extend or scale down the system.

While the present invention has been described with reference to exemplary embodiments thereof, it will be understood by those skilled in the art that various changes in form and details may be made therein without departing from the scope of the present invention as defined by the following claims.

What is claimed is:

1. A video monitoring system for configuring and displaying a multiplexed image consisting of a plurality of pictures each corresponding to a video signal captured by each of video cameras, comprising:
    A/D (Analog/Digital) converters, each of which converts a channel video signal outputted from the corresponding video camera into digital video data and outputs the digital video data through a video source channel;
    one or more slave video signal processors coupled in a daisy chain manner, each of which scales down digital video data of individual channels outputted through the video source channels from each of the A/D converters, outputs the scaled-down digital video data to a first bypass channel of the slave video signal processor, re-collects digital video data outputted through a first bypass channel of a preceding slave video signal processor and collected digital video data outputted through a second bypass channel of the preceding slave video signal processor, and outputs the re-collected data to a second bypass channel of the slave video signal processor;
    a master video signal processor that scales down the digital video data of individual channels outputted through a video source channel from the A/D converters, records on a frame memory the scaled-down digital video data and digital video data outputted from first and second bypass channels of a previous slave video signal processor, and configures and outputs video data corresponding to a multiplexed image; and
    a D/A (Digital/Analog) converter for converting the video data corresponding to the multiplexed image into an analog video signal and outputting the analog video signal to a video display device.

2. The video monitoring system of claim 1, wherein each slave video signal processor includes:
    video input controllers converting digital video data outputted through the video source channel from the A/D converter to a format suitable for internal processing;
    horizontal/vertical scalers for scaling down the digital video data outputted from the video input controllers in horizontal and vertical directions;
    input buffers temporarily storing scaled down digital video data outputted from the horizontal/vertical scalers and outputting the scaled-down digital video data to the first bypass channel; and
    a bypass buffer temporarily storing the digital video data outputted from the first and second bypass channels of the preceding slave video signal processor and outputting the stored digital video data to the second bypass channel of the present slave video signal processor.

3. The video monitoring system of claim 2, wherein the master video signal processor includes:
    video input controllers converting digital video data outputted through the video source channel from the A/D converter to a format suitable for internal processing;
    horizontal/vertical scalers scaling down the digital video data outputted from each of the video input controllers in horizontal and vertical directions;
    an input buffer temporarily storing the scaled-down digital video data outputted from the horizontal/vertical scalers and outputting the scaled-down digital video data through one or more channels;
    a bypass buffer temporarily storing the digital video data outputted from the first and second bypass channels of a preceding slave video signal processor and outputting the digital video data to one or more channels;
    a memory controller for reading the video data from the input buffer and the bypass buffer in burst mode, recording the video data at designated addresses of the frame memory to configure video data corresponding to a multiplexed image, and reading and outputting the configured video data so that the multiplexed image can be displayed in real time;
    an output buffer temporarily storing video data corresponding to the multiplexed image outputted from the memory controller; and
    a video output controller combining the video data outputted from the output buffer with supplementary information and outputting the video data combined with the supplementary information.

4. The video monitoring system of claim 2, wherein the master video signal processor includes:
    video input controllers for extending the digital video data of the video source channel outputted from each A/D converter and separating and controlling synchronous signals;
    horizontal/vertical scalers for reducing the digital video data outputted from each video input controller in horizontal and vertical directions;
    input buffers for temporarily storing the reduced digital video data outputted from each of the horizontal/vertical scalers and outputting the stored digital video data through one or more channels;
    a bypass buffer for temporarily storing the digital video data outputted from the first bypass channel and the second bypass channel placed at the front stage of the master video signal processor and outputting the stored digital video data through one or more channels;
    a memory controller for reading the video data from each input buffer and the bypass buffer on a burst-unit basis, recording the read video data at designation addresses of the frame memory, configuring multiple channel divided display screens and reading out the recorded video data so that the configured multiple divided display screens can be displayed in real time;

an output buffer for storing the video data of one display screen outputted from the memory controller; and a video output controller for combining supplementary information with the video data of the one display screen outputted from the output buffer and outputting the video data and the supplementary information.

5. The video monitoring system of claim 2, wherein the number of the slave video signal processors is one, two or three, and the one, two or three slave video signal processors are coupled to the master video signal processor by the daisy chain.

6. The video monitoring system of claim 1, wherein the master video signal processor includes:

video input controllers converting digital video data outputted through the video source channel from the A/D converter to a format suitable for internal processing;

horizontal/vertical scalers scaling down the digital video data outputted from each of the video input controllers in horizontal and vertical directions;

an input buffer temporarily storing the scaled-down digital video data outputted from the horizontal/vertical scalers and outputting the scaled-down digital video data through one or more channels;

a bypass buffer temporarily storing digital video data outputted from first and second bypass channels of a preceding slave video signal processor and outputting the digital video data to one or more channels;

a memory controller for reading the video data from the input buffer and the bypass buffer in burst mode, recording the video data at designated addresses of the frame memory to configure video data corresponding to a multiplexed image, and reading and outputting the configured video data so that the multiplexed image can be displayed in real time;

an output buffer temporarily storing video data corresponding to the multiplexed image outputted from the memory controller; and a video output controller combining the video data outputted from the output buffer with supplementary information and outputting the video data combined with the supplementary information.

7. A video monitoring system configuring and displaying a multiplexed image consisting of a plurality of pictures each corresponding to a video signal captured by each of video cameras, comprising:

A/D converters, each of which converts a channel video signal outputted from the corresponding video camera into digital video data and outputs the digital data through a video source channel;

one or more slave video signal processors coupled in a daisy chain manner, each of which scales down digital video data of individual channels outputted through a video source channel from each of the A/D converters, outputs the scaled-down digital video data to a first bypass channel of the slave video signal processor, re-collects digital video data outputted through a first bypass channel of a preceding slave video signal processor and collected digital video data outputted through a second bypass channel of the preceding slave video signal processor, and outputs the re-collected data to a second bypass channel of the slave video signal processor;

a master video signal processor that scales down digital video data of individual channels outputted through a video source channel from the A/D converters, configures video data corresponding to a multiplexed image from the scaled-down digital video data and digital video data outputted from first and second bypass channels of a last slave video signal processor, and outputs the video data corresponding to the multiplexed image; and a D/A converter converting the video data corresponding to the multiplexed image into an analog video signal and outputting the analog video signal to a video display device.

8. A video monitoring system configuring and displaying a multiplexed image consisting of a plurality of pictures each corresponding to a video signal captured by each of video cameras, comprising:

Digital A/D converters, each of which converts a channel video signal outputted from the corresponding video camera into digital video data and outputs the digital video data through a video source channel;

one or more slave video signal processors coupled in a daisy chain manner, each of which scales down digital video data of individual channels output through a video source channel from each of the A/D converters according to a scale-down ratio based on the number of pictures constituting the multiplexed image, outputs the scaled-down digital video data to a first bypass channel of the slave video signal processor, re-collects digital video data outputted through a first bypass channel of a preceding slave video signal processor and collected digital video data outputted through a second bypass channel of the preceding slave video signal processor, and outputs the re-collected data to a second bypass channel of the slave video signal processor;

a master video signal processor that scales down digital video data of individual channels outputted through a video source channel from the A/D converters according to a scale-down ratio based on the number of pictures constituting a multiplexed image, configures video data corresponding to a multiplexed image from the scaled-down digital video data and digital video data outputted from first and second bypass channels of a previous slave video signal processor, and outputs the video data corresponding to the multiplexed image; and a D/A converter converting the video data corresponding to the multiplexed image into an analog video signal and outputting the analog video signal to a video display device.

* * * * *